(12) United States Patent
Fichera (10) Patent No.: US 9,545,050 B2
(45) Date of Patent: Jan. 17, 2017

(54) MOISTURE REMOVAL ATTACHMENT FOR POWERED LAWNMOWER

(71) Applicant: John Fichera, Seabrook, NH (US)

(72) Inventor: John Fichera, Seabrook, NH (US)

(73) Assignee: AD & Ogre LLC, Seabrook, NH (US)

(\*) Notice: Subject to any disclaimer, the term of this patent is extended or adjusted under 35 U.S.C. 154(b) by 36 days.

(21) Appl. No.: 14/220,163

(22) Filed: Mar. 20, 2014

(65) Prior Publication Data

US 2014/0331628 A1 Nov. 13, 2014

Related U.S. Application Data

(60) Provisional application No. 61/821,077, filed on May 8, 2013.

(51) Int. Cl.
*A01D 34/00* (2006.01)

(52) U.S. Cl.
CPC .................... *A01D 34/001* (2013.01)

(58) Field of Classification Search
CPC ............ A01B 45/00; A01D 42/00–42/08; A01D 43/003; A01D 57/01; A01D 34/001
See application file for complete search history.

(56) References Cited

U.S. PATENT DOCUMENTS

| | | | | |
|---|---|---|---|---|
| 1,379,555 A * | 5/1921 | Goodfellow | | 56/249 |
| 1,572,297 A * | 2/1926 | Laver | | 56/249 |
| 1,757,844 A * | 5/1930 | Pol | | 56/249 |
| 2,053,506 A * | 9/1936 | Welf | | 56/249 |
| 2,198,526 A * | 4/1940 | Cockburn | | 56/320.2 |
| 3,422,553 A * | 1/1969 | Holloway | | 37/231 |
| 3,747,430 A | 7/1973 | Miner | | |
| 3,808,739 A * | 5/1974 | Newgent | | 47/1.5 |
| 3,954,499 A | 5/1976 | Canto | | |
| D244,506 S * | 5/1977 | Yankee | | D32/51 |
| 4,021,996 A * | 5/1977 | Bartlett et al. | | 56/7 |
| 4,322,936 A * | 4/1982 | Whitney | | 56/16.1 |
| 4,541,230 A | 9/1985 | Huerter | | |
| 4,558,746 A * | 12/1985 | Powell et al. | | 172/421 |
| 4,615,130 A * | 10/1986 | Racicot | | 37/231 |
| 4,680,880 A * | 7/1987 | Boneta | | 37/236 |
| 4,717,166 A * | 1/1988 | Vachon | | 280/481 |

(Continued)

FOREIGN PATENT DOCUMENTS

WO 03094597 A1 11/2003
WO 2005086685 A2 9/2005

*Primary Examiner* — Alicia Torres
*Assistant Examiner* — Adam Behrens
(74) *Attorney, Agent, or Firm* — Ross Krutsinger; Mesmer & Deleault PLLC (57) ABSTRACT

An attachment for a power lawnmower enables cutting wet grass and includes a cross bar adapted to be supported by the forward end of the lawnmower. An elongated support member has a front frame portion and a rear frame portion, where the rear frame portion is secured transversely to the cross bar and extends forwardly therefrom. A rigid bracket is connected transversely to the front frame portion of the elongated support member and cantilevered above the ground. A flexible member has a first side secured along the rigid bracket and has a second side extending below the rigid bracket. The flexible member is adapted to contact the wet grass during forward movement of the lawnmower in order to remove moisture from the wet grass.

4 Claims, 10 Drawing Sheets

(56) References Cited

U.S. PATENT DOCUMENTS

| | | | |
|---|---|---|---|
| 4,944,103 A | | 7/1990 | Rzechula |
| 4,987,731 A | * | 1/1991 | Cianciulli et al. ............. 56/17.5 |
| 5,018,587 A | | 5/1991 | Gandrud et al. |
| 6,112,657 A | | 9/2000 | Bill |
| 6,122,904 A | * | 9/2000 | Garcia de Alba ............ 56/16.9 |
| 6,308,505 B1 | | 10/2001 | Beckett |
| 6,574,819 B1 | | 6/2003 | Ratcliffe |
| 6,631,608 B1 | * | 10/2003 | Eykelkamp ................... 56/15.6 |
| 7,069,711 B1 | * | 7/2006 | Connell et al. ................. 56/249 |
| 7,337,600 B2 | * | 3/2008 | Kallevig et al. .............. 56/17.4 |
| 7,401,378 B2 | | 7/2008 | Hobbs et al. |
| 7,478,681 B2 | | 1/2009 | Alston |
| 7,641,420 B2 | | 1/2010 | Becker et al. |
| 7,665,286 B2 | | 2/2010 | Butler et al. |
| 8,001,753 B2 | * | 8/2011 | Franco ........................... 56/15.9 |
| 8,191,346 B2 | | 6/2012 | Flora et al. |
| 8,220,240 B2 | * | 7/2012 | Tielburger ................ 56/400.04 |
| 8,720,596 B1 | * | 5/2014 | Martinez ......................... 172/63 |
| 2006/0096133 A1 | * | 5/2006 | Sanders et al. ................. 37/241 |
| 2006/0123760 A1 | * | 6/2006 | Glasscock ...................... 56/17.3 |
| 2006/0236670 A1 | * | 10/2006 | Glasford et al. ................ 56/257 |
| 2007/0187118 A1 | * | 8/2007 | Belanger .......................... 172/1 |
| 2007/0256846 A1 | * | 11/2007 | Gibbs ............................. 172/452 |
| 2008/0289310 A1 | * | 11/2008 | Hagen et al. ................... 56/14.9 |
| 2010/0154374 A1 | * | 6/2010 | Hibino et al. ................... 56/249 |
| 2010/0164202 A1 | * | 7/2010 | Dilworth et al. ............. 280/477 |
| 2010/0313537 A1 | * | 12/2010 | Lundberg ...................... 56/14.9 |
| 2012/0324665 A1 | * | 12/2012 | Miller ......................... 15/144.1 |

\* cited by examiner

MOISTURE REMOVAL ATTACHMENT FOR POWERED LAWNMOWER

BACKGROUND OF THE INVENTION

1. Field of the Invention

The present invention relates generally to lawn care equipment and more particularly to attachments for powered lawnmowers.

2. Description of the Prior Art

Lawnmowers have been used for many years to cut grass at residences, businesses, and sports fields. In humid climates grass is often wet with dew until late morning. Grass also becomes wet due to sprinklers or rain. Cutting wet grass causes many problems for the grass and for the mower.

When grass is cut while wet, the mower blades tend to tear the grass blades instead of providing clean cuts. This not only results in uneven grass length, but leads to fungal problems and disease for the grass.

Another problem of cutting wet grass is that wet grass makes a lawnmower work harder, which requires the operator to drive the lawnmower at a slower speed over the grass. An additional problem is that clippings from wet grass clog the mower deck and discharge chutes. As a result, the mower operator spends significant amounts of time unclogging grass from lawnmower blades and underside of the mower deck in addition to cleaning wet grass from the outside of the mower after use. Further, wet grass tends to clump and leave unsightly piles of cut grass on the lawn.

One approach to cutting wet grass has been to ignore the problem. For lawn crews, waiting for the grass to dry means waiting to work. For a lawn crew that cuts twenty or more lawns in one day, waiting until late morning to start work means being able to cut fewer lawns before daylight runs out.

For those who do not ignore it, the problem of wet grass has been approached using a variety of methods. One solution is to wait until the grass is dry before cutting. Another solution to the problem of wet grass has been to use a leaf blower to remove water from the grass. Similarly, another solution has been to use a corn broom or the like to manually sweep the lawn to remove water from the grass prior to mowing.

U.S. Pat. No. 6,574,819 to Ratcliffe discloses a method and apparatus for removing dew from grass, such as golf courses. The '819 patent discloses a plurality of beaded lines that have weights disposed within a synthetic rope sheath. Ends of the rope are attached to one or two separate lawn tractors. Dew is removed by attaching the rope-like device to one or more lawn tractors and dragging the device across grassy areas.

International published patent application no. WO 2003/094597 to Johann Fimbinger GmbH discloses another method and apparatus for removing dew from grass, especially putting greens of golf courses. The '597 application discloses a hand-operated apparatus having groups of rollers disposed in parallel rows and that have the ability to rotate freely about longitudinal axes. Two handles extend up from the rollers and are attached to the rollers in an articulated manner. The operator uses two handles to push the rollers over the grass with a motion similar to that used for a large floor sweeper.

SUMMARY OF THE INVENTION

As described above, the solutions or non-solutions to the problem of wet grass have not fully met the needs of commercial grass cutting companies and homeowners. For those who ignore the problem and proceed with cutting wet grass, work is inefficient due to the increased load on a lawnmower, the additional time needed to clean and de-clog lawnmowers, and the additional time needed to remove clumps of cut grass from the lawn. Also, grass cutting contractors risk losing work from unhappy customers when lawn cutting appointments are not kept or if lawns become diseased due to grass damage that results from being cut when wet.

For those who choose to wait for wet grass to dry before cutting it, this approach is generally impractical for homeowners and commercial lawn services alike. For a busy homeowner, waiting for a lawn to dry can require a half day in sunny weather, and may take several days in poorer weather. The limited window of opportunity to cut a lawn (e.g., a homeowner's weekday evening or weekend morning) may close by the time the grass is dry. A contributing factor to the problem is that the time needed for grass to dry is increased in high humidity, during cool and overcast weather, or when intermittent precipitation continues to moisten the grass. With such delays, the grass may grow significantly before it is finally cut.

For the solutions of manually sweeping or blowing dry a lawn, these solutions have shown to be only partially effective and require the additional time and effort to blow or sweep the grass dry. For larger lawns and sports fields, these extra steps are simply too time consuming and inefficient to be practical.

Rope-like devices dragged over a grassy area are also impractical for use on lawns and fields. Because the device is dragged behind a lawnmower or tractor, the dragging step must be performed prior to cutting the grass. Like other methods, this added step increases the time needed to cut a lawn or field. Also, dragging a rope-like device around a residential or commercial lawn involves the risk of the device becoming entangled with or damaging, trees, bushes, sprinkler systems, or other structures. Further, in tight areas of a lawn, such as near a building or house, the available space is not large enough for effectively dragging a device over all areas of the wet grass.

Accordingly, a need exists for an improved apparatus and method for removing dew and other moisture from grass so that the grass may be cut when wet. It is an object of the present invention to provide a lawnmower attachment that improves the efficiency and ease of removing water from wet grass.

The present invention achieves this and other objectives by providing a lawnmower attachment having a flexible member that contacts the grass in front of a lawnmower to remove moisture during forward movement of the lawnmower. In one embodiment, a lawnmower attachment has a longitudinal, generally horizontal, rigid bracket member attachable to the front of a lawnmower. A longitudinal flexible member has a first side secured along the longitudinal, rigid bracket member. A second side of the flexible member extends downward from the longitudinal, rigid bracket member, where the flexible member is sized to extend downward to contact the wet grass. Without being restricted to any particular theory, it is believed that the flexible member removes water from the grass by deflecting the grass from an upright position and by brushing away water from grass blades as the lawnmower moves across a lawn.

In another embodiment, a lawnmower attachment has a generally horizontal cross bar with a first end and a second end. The cross bar is adapted to be supported by a front end portion of a lawnmower. A plurality of rear support brackets extend rearwardly from the cross bar and are sized to engage the front end portion of the lawnmower. An elongated support member is connected to the cross bar and has a front portion and a rear portion. The front portion extends forwardly from the cross bar. A longitudinal, rigid bracket member is attached to the front portion of the elongated support member in cantilevered support above the ground. The rigid bracket member extends substantially horizontal and transverse to a forward cutting path of the lawnmower. The weight of the rigid bracket member cantilevered in front of the cross bar biases the attachment to pivot about the cross bar so that the rear support brackets are urged upward to engage the front end portion of the lawnmower, such as a lower edge of the lawnmower frame. A longitudinal flexible member has a first side secured along the rigid bracket member and has a free second side that extends downward from the rigid bracket member. The flexible member is sized so that the free second side contacts the grass when the lawnmower moves across the lawn.

In another embodiment, an attachment for a power lawnmower includes a cross bar configured for removable attachment across the forward end portion of a powered lawnmower. An elongated support member is secured to the cross bar and extends forwardly therefrom. A rigid bracket is connected transversely to the elongated support member and in cantilevered support above the ground. A flexible member has a first side secured along the rigid bracket and has a free second side extending below the rigid bracket and sized to contact the grass to remove moisture from the grass during forward movement of the lawnmower.

In another embodiment, the attachment has a lifting apparatus adapted to raise and lower the flexible member between a first position and a second position. In the first position, the free second side of the flexible member is suspended above the grass. In the second position the second side of the flexible member contacts the grass.

DETAILED DESCRIPTION OF THE PREFERRED EMBODIMENT

Figure 1:
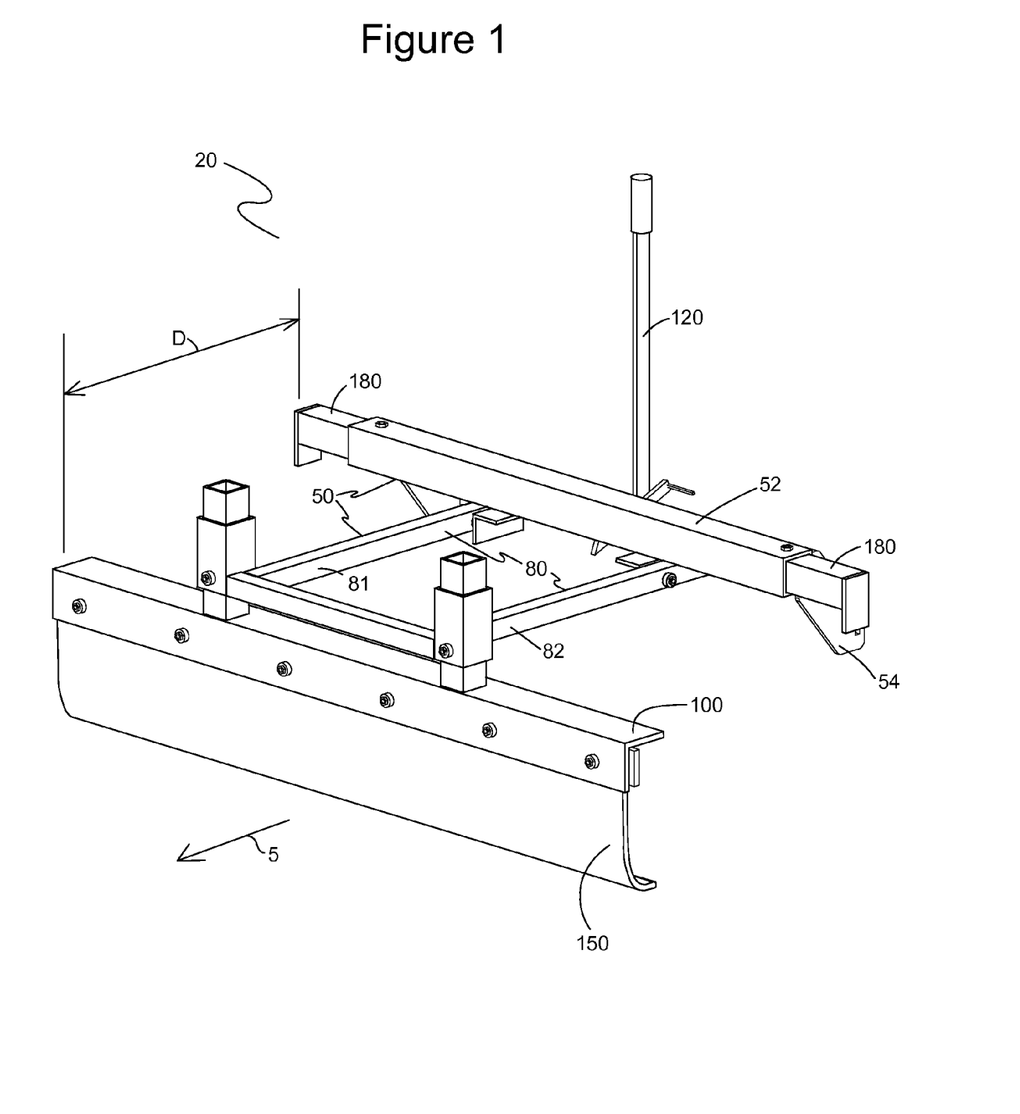
FIG. 1 is a perspective view of one embodiment of a lawnmower attachment of the present invention as viewed from the front, left side.

The preferred embodiment of the present invention is illustrated in FIGS. 1-14. FIG. 1 shows a perspective view of one embodiment of an attachment 20 for a lawnmower 2 (shown in FIGS. 4 & 9) as viewed from the front, left side. In this application, the terms "right side" and "left side" refer to sides of lawnmower attachment 20 as viewed from a lawnmower operator's perspective while operating the lawnmower 2 moving along a forward cutting path 5 (lawnmower 2 is illustrated, e.g., in FIG. 9). Attachment 20 includes a mounting frame 50 with cross bar 52 and an elongated support member 80 with a pair of arms 81, 82. A rigid bracket member 100 is attached to elongated support member 80 so that rigid bracket member 100 is transverse to support member 80. A flexible member 150 is attached to rigid bracket member 100. An optional lever 120 is attached to mounting frame 50 and is useful to optionally raise and lower flexible member 150 above the ground. It is contemplated that the pair of arms 81, 82 may be substituted with a single arm 81 adapted and configured to support the rigid bracket member 100 with flexible member 150.

Figure 3:
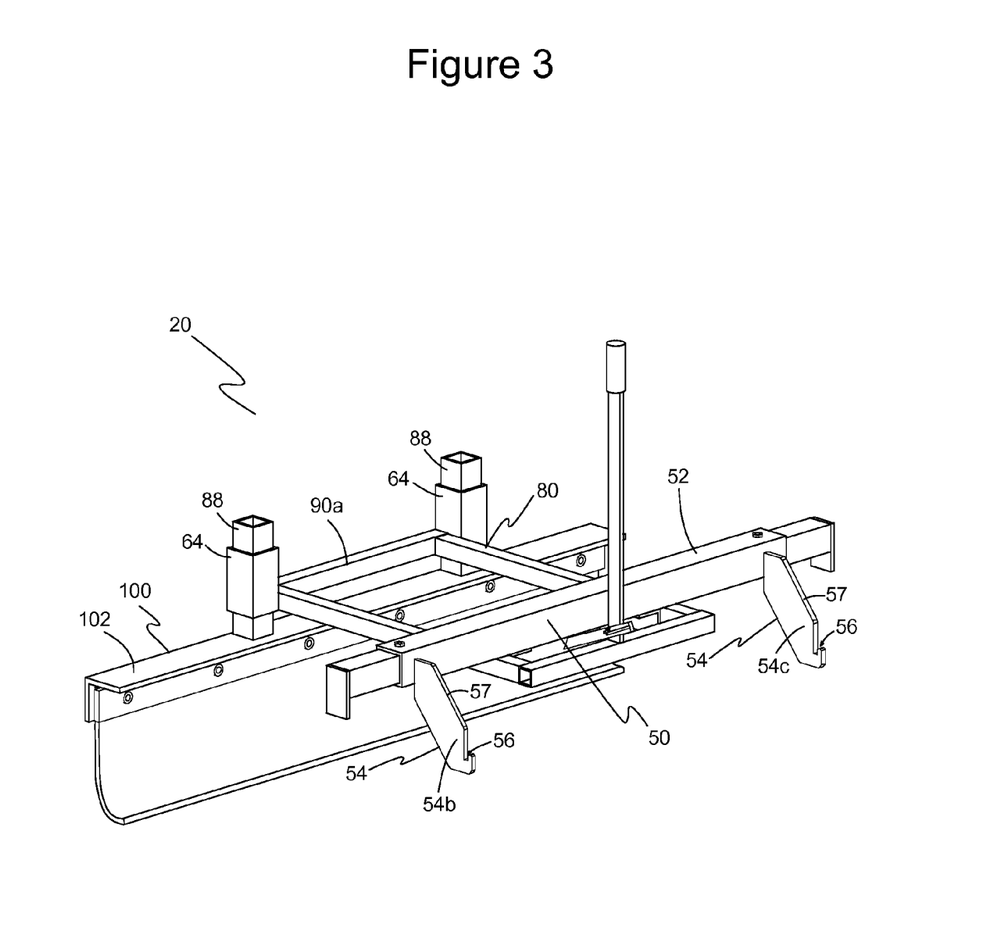
FIG. 3 is a perspective view of the lawnmower attachment of FIG. 1 as viewed from the left, rear side of the attachment.
Figure 4:
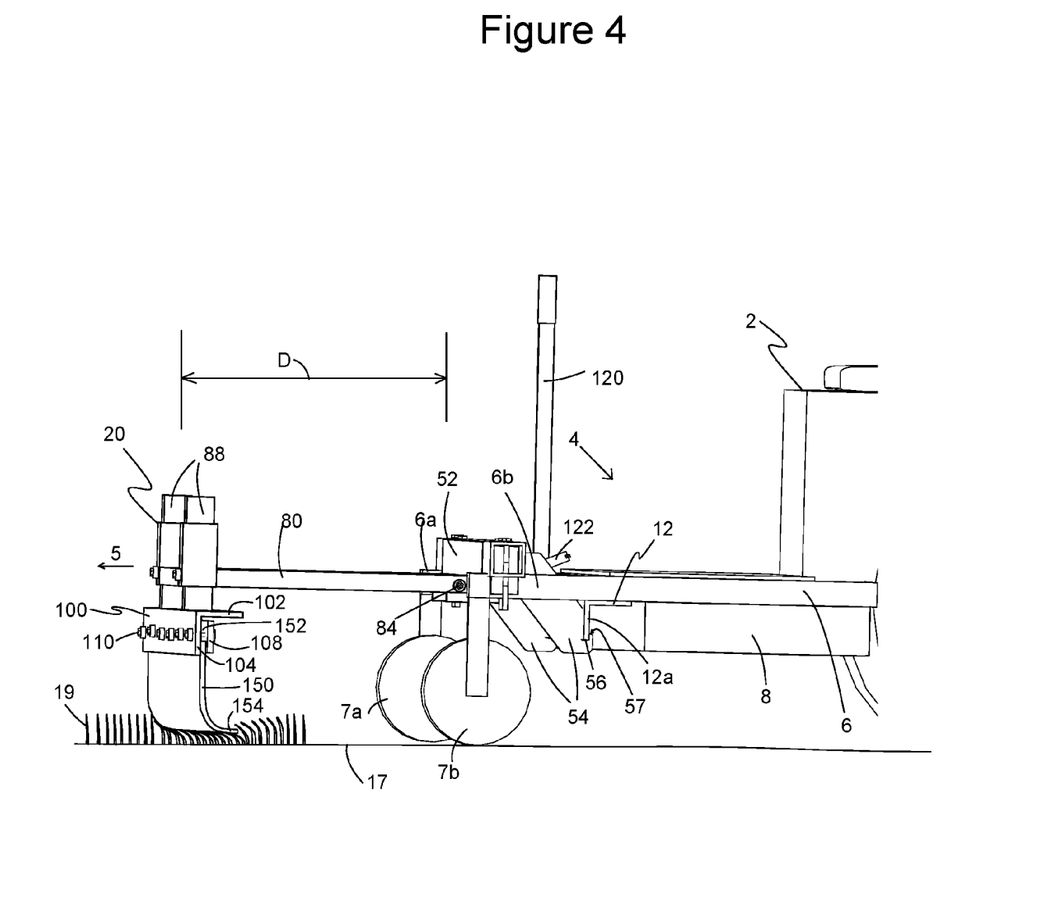
FIG. 4 is a left side view of another embodiment of a lawnmower attachment of the present invention shown installed on a commercial-type riding lawnmower.
Figure 9:
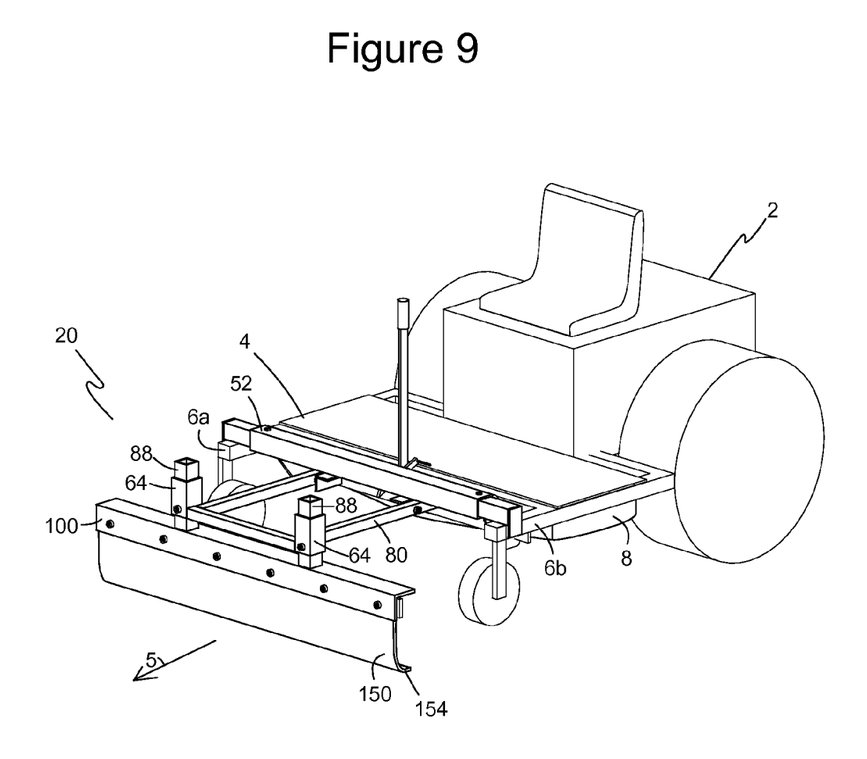
FIG. 9 is a front, right, perspective view of the attachment of FIG. 1 shown installed on a commercial-type riding lawnmower.

Mounting frame 50 includes a cross bar 52 that is supported by a forward end portion 4 of lawnmower 2 (shown in FIGS. 4 & 9). Mounting frame 50 also includes elongated support members 80 that are attached transversely to cross bar 52 and extends forward from cross bar 52 a predefined distance D. Rigid bracket member 100 is connected to elongated support member 80 and extends transverse to forward cutting path 5. One or more rear support brackets 54 extend transversely from cross bar 52 in a rearward direction to engage front end portion 4 of lawnmower 2, such as lawnmower frame 6. Rear support brackets 54 are discussed in more detail below with reference to FIG. 3.

In one embodiment, cross bar 52 is made of tubular or L-shaped metal bars, angle iron, or similar materials and is sized to be supported by or attached to a lawnmower frame 6. Preferably, cross bar 52 is made of 1.5"-2" square tubular steel, which provides the desired strength to support elongated support member 80, rigid bracket member 100, flexible member 150, and other parts of attachment 20. In one embodiment, cross bar 52 is fastened to or supported by wheel forks (e.g., frame members 6) of a commercial or zero-turn-style lawnmower as discussed below with reference to FIG. 9. In one embodiment, cross bar 52 optionally includes cross bar extension assembly 180, which is discussed in more detail below.

Figure 2:
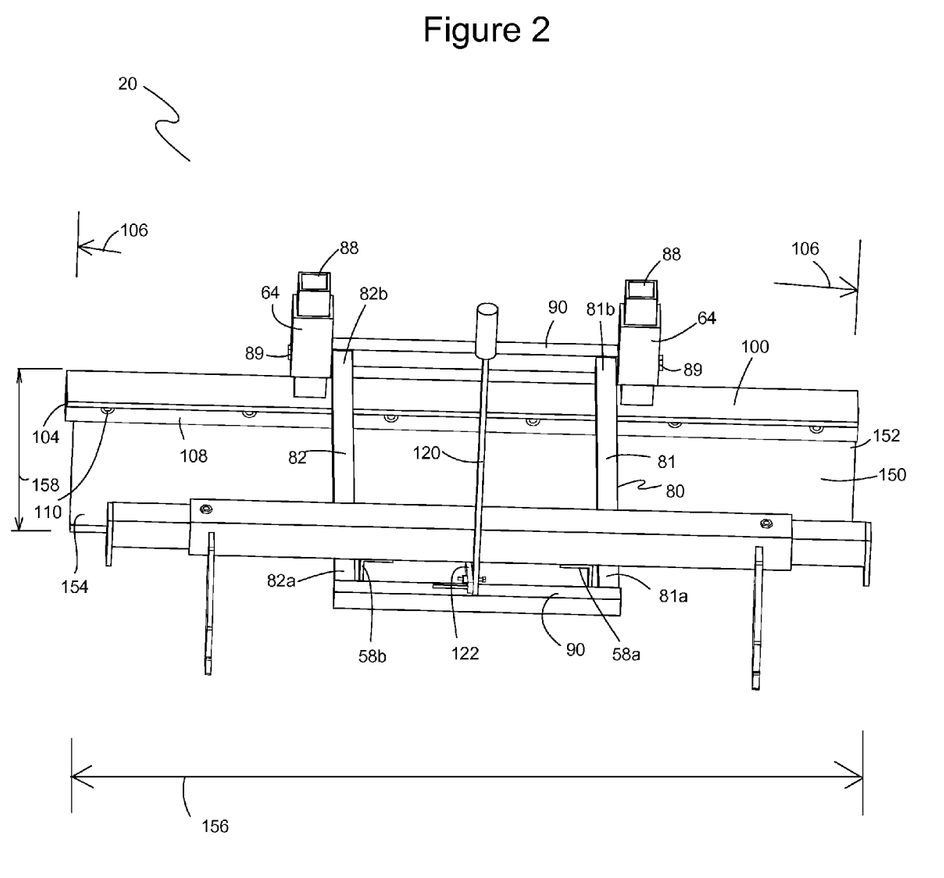
FIG. 2 is top view of the lawnmower attachment of FIG. 1 as viewed from above and behind the attachment.

Referring now to FIG. 2, attachment 20 of FIG. 1 is shown as viewed from behind and above the attachment 20. Elongated support member 80 in one embodiment has spaced-apart first and second arms 81, 82 that are attached to cross bar 52 at or near their rear portions 81a, 82a, respectively. In one embodiment, first and second arms 81, 82 extend both forward and backward of cross bar 52, with the majority of arms 81, 82 being forward of cross bar 52. In other embodiments, arms 81, 82 extend only forward of cross bar 52.

One or more cross pieces 90 preferably extend between and connect first and second arms 81, 82 at their rear portions 81a, 82a and at their forward portions 81b, 82b, respectively. By forming a rectangular frame, cross pieces 90 provide added strength and rigidity to elongated support member 80 for stably supporting rigid bracket member 100 in a substantially horizontal position. In other embodiments, more or fewer arms 81, 82 may be used, such as a single arm 81 extending from cross bar 52 to rigid bracket member 100.

Elongated support member 80 is fixedly or pivotably attached to cross bar 52. Pivotable attachment of elongated support members 80 to cross bar 52 is discussed in more detail below with reference to FIG. 5. When fixedly attached, elongated support member 80 is attached by welding, by using fasteners, or other method. In one embodiment, cross bar 52 is a cross piece 90 of elongated support member 80.

Rigid bracket member 100 connects transversely to elongated support member 80 and therefore is also transverse to the forward cutting path 5 (shown in FIG. 9) of lawnmower 2. Preferably, rigid bracket member 100 is substantially perpendicular to forward cutting path 5. In one embodiment, forward portions 81b, 82b of arms 81, 82, respectively, connect directly to rigid bracket member 100, for example, by welding or being fastened with fasteners directly to rigid bracket member 100. In one embodiment, rigid bracket member 100 is made of angle iron, tubular metal, solid metal, a metal plate, or a length of L-shaped metal. Other materials and shapes of rigid bracket member 100 are acceptable.

In an embodiment as shown in FIG. 2, upright sleeves 64 are connected to elongated support member 80 at or near forward portions 81b, 82b. Upright sleeves 64 are positioned substantially vertically and are sized to slip over extension posts 88 (discussed below) that connect to and extend upward from rigid bracket member 100. In one embodiment, sleeve fasteners 89 or pins extend through upright sleeves 64 to engage extension posts 88 and are used to set and maintain a vertical position of rigid bracket member 100 with respect to elongated support member 80. By adjusting the relative position between upright sleeves 64 and extension posts 88, rigid bracket member 100 (and therefore flexible member 150) can be positioned at a desired height above the ground as needed to contact the grass.

When extension posts 88 are not used to provide adjustable height of flexible member 80, rigid bracket member 100 is preferably fixedly attached to elongated support member 80 by welding, fasteners, or other method. For example, horizontal portion 102 of rigid bracket member 100 is bolted to elongated support member 80 along a forward cross piece 90a.

Flexible member 150 has a first side portion 152 and a second side portion 154. First side portion 152 is attached to rigid bracket member 100, preferably along its length. In one embodiment, Second side portion 154 of flexible member 150 extends unattached below rigid bracket member 100 and is sized to extend (e.g., six to ten inches) to contact the grass during forward movement of lawnmower 2 (shown in FIG. 9). In other embodiments, a plurality of flexible members 150 is attached to rigid bracket member 100.

In one embodiment, flexible member 150 is secured to a vertical portion 104 of rigid bracket member 100 using one or more clamping plates 108. For example, flexible member 150 is positioned between clamping plate(s) 108 and vertical portion 104 of rigid bracket member 100 and secured with fasteners 110 extending through flexible member and rigid bracket member 100.

Flexible member 150 has a width 156 that is preferably about equal to a predefined length 106 of rigid bracket member 100. Flexible member 150 preferably has a height 158 of about 6-8 inches between first side portion 152 and second side portion 154. Other values for height 158 are acceptable provided that height 158 is sufficient for flexible member 150 to contact the grass and be able to yield or bend when in contact with the grass. Height 158 of flexible member 150 is preferably chosen so that first end 152 of flexible member 150 can be attached to rigid bracket member 100 and second side portion 154 can extend downward into grass that is approximately of 2 to 5 inches tall. Height 158 is also preferably selected so that second side portion 154 bends or lays flat on the grass 19 (shown in FIG. 4) when flexible member 150 moves across the lawn. In one embodiment, second side portion 154 of flexible member extends to about one inch above the soil 17 (shown in FIG. 4) regardless of the grass 19 depth. That is, flexible member 150 contacts the portion of the grass blades that are taller than one inch. One method of adjusting the height of flexible member 150 is to adjust the position of extension posts 88 in sleeves 64.

In one embodiment, flexible member is made of a continuous, flexible rubber sheet with a thickness of about 10-12 mm. Thicknesses from about 6 mm to about 18 mm are acceptable. Vinyl, PVC, EPDM rubber, vulcanized tire rubber, natural rubber, and other materials of flexible member 150 are acceptable and may be selected so that second side portion 154 yields or bends to substantially lay flat when in contact with the grass. Materials that are too rigid tend to undesirably pull grass out of the ground or break it off. On the other hand, selecting a material that is too thin or too flexible causes flexible member 150 to lack the needed durability for repeated use or fail to remove a sufficient amount of water from the grass. In another embodiment, flexible member 150 has a plurality of flexible fingers (not shown) that, as a group, define flexible member 150 and extend from rigid bracket member 100. Flexible fingers may be separated by a gap or separated only by a cut with substantially no gap between adjacent fingers.

Optional lever 120 is fixedly connected to and extends up from a rear cross bar 90b of elongated support member 80. Lever 120 is used to raise or lower rigid bracket member 100 (and flexible member 150) between a first, raised position and a second, lowered position by pivoting elongated support member 80 about pivot brackets 58a, 58b. For example, as lever 120 is pulled backward by an operator, elongated support member 80 pivots about pivot brackets 58 to raise forward portions 81b, 82b and rigid bracket member 100. A locking bar 122 can then be pivoted downward and positioned below cross bar 52 as a stop to retain rigid bracket member 100 in a first, raised position where flexible member 150 preferably does not contact the grass. The first, raised position of flexible member 150 is useful when transporting lawnmower 2 or when attachment 20 is not needed to remove moisture from the grass. In its second, lowered position, flexible member 150 contacts the grass to remove water.

Referring now to FIG. 3, attachment 20 of FIG. 1 is illustrated as viewed from a left, rear perspective and shows rear support brackets 54. In one embodiment, rear support brackets 54 are steel plates welded or otherwise connected to cross bar 52 and extend rearwardly of cross bar 52. Rear support bracket(s) 54 are shaped and sized to engage lawnmower frame 6, for example, by engaging or catching on a front portion 4 of lawnmower 2 (shown in FIG. 4) of lawnmower 2. In some embodiments, each rear support bracket 54 has a protrusion, hook, catch, tab, opening, or other engagement structure 56 that provides a point of attachment to or engagement with lawnmower frame 6. In one embodiment, engagement structure 56 is an upward-facing notch or an upward-facing edge 57 of rear support bracket 54. In another embodiment, engagement structure 56 is an opening, slot, catch, or lip. Rear support bracket(s) 54 preferably also extend in a downward direction from cross bar 52 to reach a lower edge 12a of horizontal frame member 12 that is positioned vertically below frame members 6 that support cross bar 52. In one embodiment, rear support bracket 54 is a steel post extending rearwardly of cross bar 52 and sized to engage a hook, loop, catch, or other feature on lawnmower 2.

With cross bar 52 supported by lawnmower 2 (shown in FIG. 9), which bears the weight of attachment 20, rear support brackets 54 engage lawnmower 2 to prevent rigid bracket member and attachment 20 from tipping down as cross bar 52 remains supported. Thus, rear support brackets 54 provide cantilevered support of flexible member 150 extending substantially horizontally across a forward cutting path 5 of lawnmower 2.

Referring now to FIG. 4, a side view shows attachment 20 installed on a lawnmower 2. Cross bar 52 is supported by frame members 6a, 6b, which extend forward of cutting deck 8 and include wheels 7a, 7b, respectively. Rear support brackets 54 extend rearwardly and downwardly from cross bar 52 to engage a bottom edge 12a of a frame member 12 of lawnmower 2. For example, frame member 12 is an L-shaped length of metal with lower edge 12a that is positioned below frame members 6a, 6b and extends across a front portion 4 of lawnmower 2.

As shown in FIG. 4, engagement structure 56 is a notch sized and shaped to catch or receive bottom edge 12a of a horizontal frame member 12 of lawnmower frame 6. In other embodiments, engagement structure 56 is an opening, hook, catch, pad, or other feature on rear support bracket 54 and is used to engage or connect rear support bracket 54 to lawnmower frame 6. In some embodiments, each rear support bracket 54 need only engage a bottom surface of lawnmower frame 6, such as with a pad or upwardly-facing surface 57 on support bracket 54. Such an embodiment is appropriate where cross bar 52 is prevented from traveling forward (or backward) on lawnmower frame 6 due, for example, to a raised portion, bolt head, or other structure on top of frame members 6a, 6b. Thus, support bracket(s) 54 maintain elongated support member 80 and rigid bracket member 100 cantilevered above the soil 17 in front of lawnmower 2 since attachment 20 is biased to pivot support bracket(s) 54 about cross bar 52 and upward against the bottom of lawnmower frame 6. As noted above, second side portion 154 of flexible member 150 yields to grass 19 and lays flat as lawnmower 2 moves forward.

Because cross bar 52 is supported from below by frame members 6a, 6b, the weight of attachment 20 positioned forward of cross bar 52 exerts a downward force on cross bar 52 and biases rear support brackets 54a, 54b to pivot upward about cross bar 52 to engage forward end 4 of lawnmower.

In this way, frame members 6a, 6b function as a fulcrum and enable mounting frame 50 to provide cantilevered support to rigid bracket member 100 and flexible member 150. Instead of or in addition to cantilevered support, mounting frame optionally 50 includes one or more wheels (not shown) connected to rigid bracket member 100 or to elongated support member 80 for the purpose of supporting rigid bracket member 100 above the ground.

As also shown in FIG. 4, rigid bracket member 100 extends forward of cross bar 52 predefined distance D. Rigid bracket member 100 is preferably positioned vertically below elongated support member 80. Distance D is preferably selected so that flexible member 150 is about ten to twelve inches or more in front of cross bar 52 and/or cutting deck 8. The value of distance D is chosen so that the grass blades have sufficient time after being deflected by flexible member 150 to stand back up to about 75-80% or more of their previous standing height before being cut by lawnmower 2 moving at its maximum speed (approximately 15-20 mph).

In one embodiment, rigid bracket member 100 is made of steel angle iron having a horizontal portion 102, a vertical portion 104, and a predefined length 106. Length 106 is preferably about equal to the deck width of lawnmower 2 (e.g., 30"-60" for a riding mower, 18"-30" for a walk-behind mower). Optionally, rigid bracket member 100 has a plurality of overlapping sections that are slidably fastened together to provide an adjustable length 106. Other configurations of rigid bracket member 100 are also acceptable, including being made of a flat strip or strips of metal, or other material that supports flexible member 150.

Figure 5:
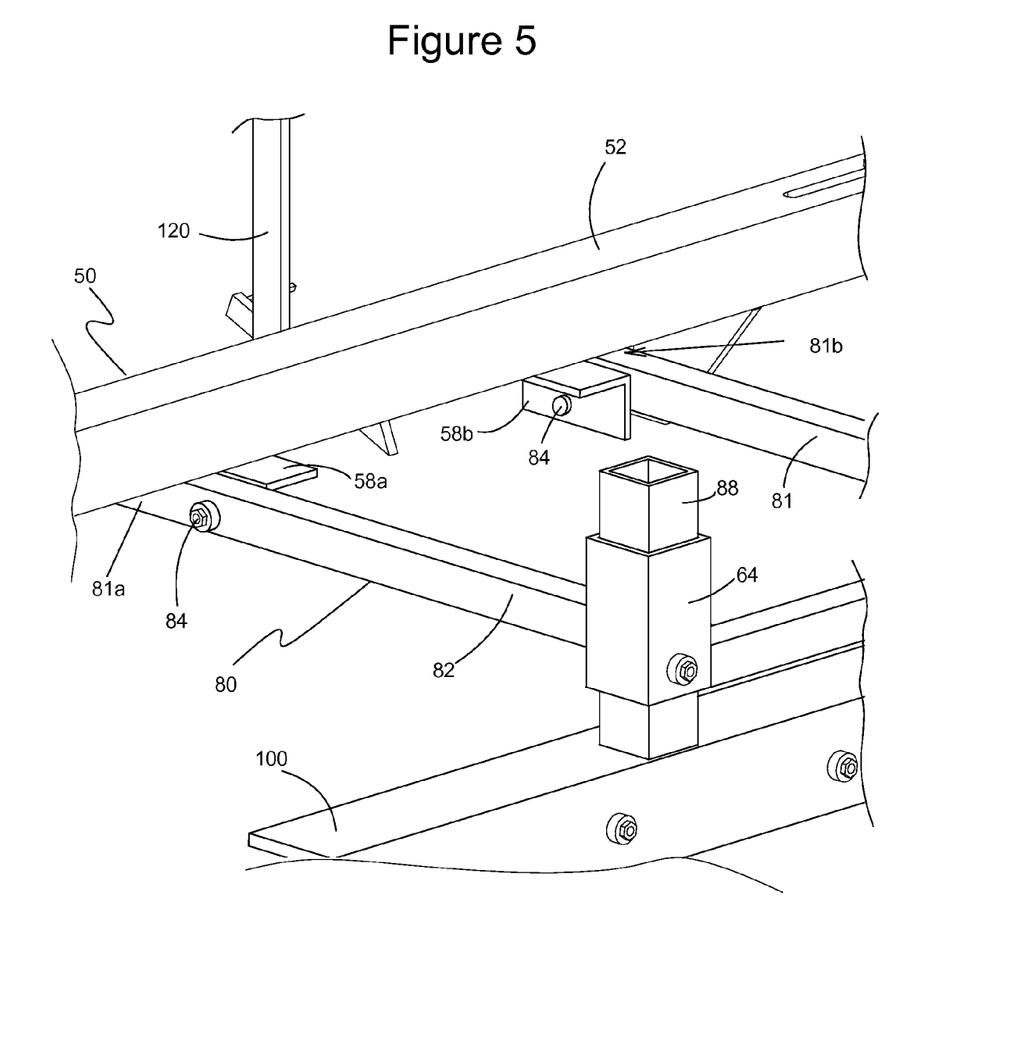
FIG. 5 is a close-up perspective view a portion of the attachment of FIG. 1 showing the elongated support member pivotably attached to the cross bar as viewed from the right, front side of the attachment.

Referring now to FIG. 5, a portion of one embodiment of mounting frame 50 is shown as viewed from the front and right side of attachment 20. Elongated support member 80 is pivotably connected to cross bar 52 with pivot brackets 58a, 58b. In one embodiment, pivot brackets 58a, 58b extend forward of cross bar 52 and are welded or otherwise fixedly attached below cross bar 52. Pivot brackets 58a, 58b are preferably made of steel angle iron, tubular steel, or the like. Pivot fasteners 84 connect each of pivot brackets 58a, 58b to first and second arms 81, 82, respectively and enable elongated support member 80 to pivot about fasteners 84 with respect to cross bar 52. Pivot fasteners 84 may be a bolt, pin, rod, or other connector that links arms 81, 82 to pivot bracket 58a, 58b, respectively. Pivot fasteners 84 are positioned forward of cross bar 52 so that rear portions 81a, 81b of elongated support member 80 abut cross bar 52 when rigid bracket member 100 pivots to its lowered position. In this way, cross bar 52 acts as a stop to define one end of the pivot range of motion of elongated support member 80. Using pivot brackets 58a, 58b, elongated support member 80 is able to pivot with respect to cross bar 52 to raise and lower rigid bracket member 100.

In other embodiments, elongated support member 80 is positioned on top of cross bar 52. The range of pivot movement of elongated support member may be defined between stops, such as cross bar 52, extensions from cross bar 52, portions of lawnmower 2, or other structures that define one or more endpoints to a range of pivot movement. Other pivot arrangements will be apparent to those skilled in the art and the examples given here do not exclude other embodiments of attachment 20 where elongated support member 80 is pivotably attached to cross bar 52 or other portions of mounting frame 50.

Figure 6:
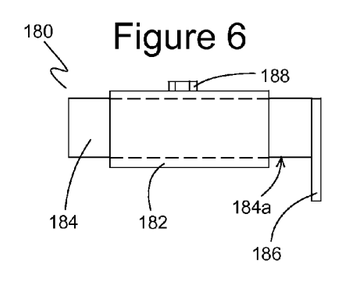
FIG. 6 is front elevational view of one embodiment of a cross bar extension assembly of the present invention showing an extension bar, end plate, and sleeve.

Referring now to FIG. 6, a front elevational view shows one embodiment of a cross bar extension assembly 180 that includes an extension sleeve 182, an extension bar 184, and an end piece 186. Extension sleeve 182 optionally has a threaded opening or nut 188 fixedly attached thereto. Opening or nut 188 is useful to fix the position of extension sleeve 182 within cross bar 52 using a threaded fastener 189 (shown in FIG. 7). In one embodiment, extension sleeve 182 is a length of square tubing made of steel and is sized to occupy space between a smaller extension bar 184 and inside of a larger tubular cross bar 52. In one embodiment, extension bar 184 is a solid length of steel bar having a square cross-sectional shape and sized to slide within extension sleeve 182. In some embodiments, extension sleeve 182 is omitted and extension bar 184 is sized to fit snugly into cross bar 52. Extension bar 184 may also be made of a tube. End piece 186 is attached to extension bar 184 with fasteners or by welding. End piece 186 extends below a bottom surface 184a of extension bar 184 and is used as a catch surface against frame members 6a, 6b (shown in FIG. 1) to prevent cross bar 52 from moving horizontally.

Figure 7:
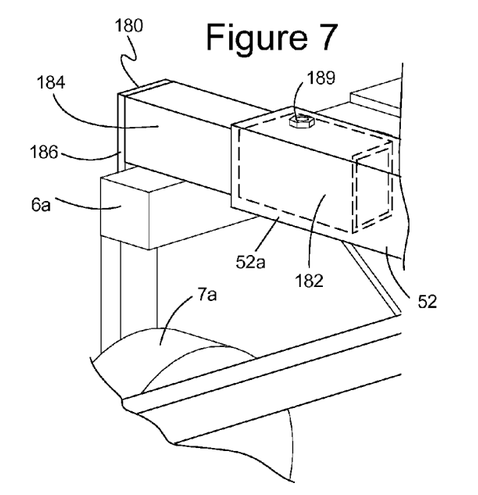
FIG. 7 is a front perspective view of one end of a cross bar showing one embodiment of a cross bar extension assembly in use with a lawnmower attachment of the present invention.

Referring now to FIG. 7, a perspective view shows an end portion 52a of cross bar 52 equipped with extension assembly 180 and supported by frame member 6a. With extension assembly 180, cross bar 52 is sized to overlap and be supported by opposite lawnmower wheel forks or frame members 6a, 6b that extend from or along a front end portion 4 of lawnmower 2 (also shown in FIGS. 8-9). If used, extension sleeve 182 (not visible) is secured inside of cross bar 52 by fastener 189. Extension bar 184 slides in or out of cross bar 52 (or extension sleeve 182) to adjust an overall length of cross bar 52 as needed. Threaded fastener 189 is advanced through cross bar 52 (and extension sleeve 182 if present) to engage extension bar 184 and fix its position. In some embodiments as illustrated in FIG. 7, cross bar 52 is loosely supported by lawnmower frame members 6a, 6b with lateral movement of cross bar 52 being restricted by a cross bar extension assembly 180 received in each end of cross bar 52. Preferably, cross bar extension assemblies 180 also grip frame members 6a, 6b to maintain the position of cross bar 52. When cross bar 52 is equipped with extension assembly 180 on each end, cross bar 52 has an adjustable length to fit lawnmowers of different sizes. In other embodiments, cross bar 52 is supported by lawnmower frame 6 (e.g., by frame members 6a, 6b) and secured only by rear support brackets 54 that engage a lower edge of lawnmower frame 6.

Figure 8:
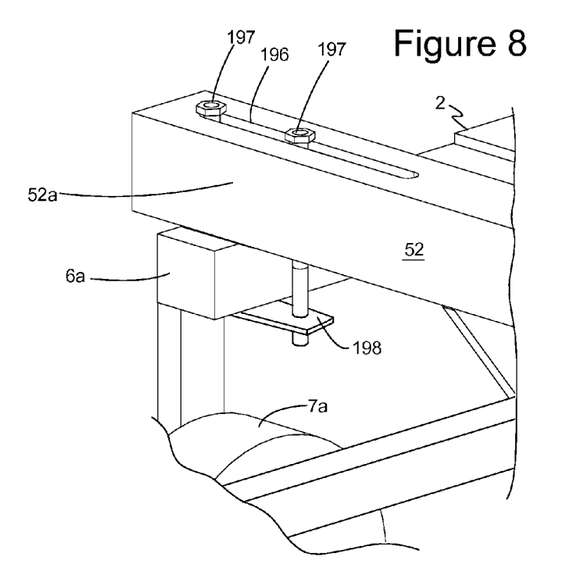
FIG. 8 is a close-up perspective view of one end of a cross bar of the present invention showing one method for securing the cross bar to a lawnmower frame member as viewed from the front, right side of the attachment.

Referring now to FIG. 8, a perspective view illustrates end portion 52a of another embodiment of cross bar 52 shown secured to frame member 6a of lawnmower 2 with fasteners 197. In other embodiments, cross bar 52 is fixedly attached to lawnmower frame 6 with bolts, welding, U-bolts, or other attachment methods. As shown in FIG. 8, end portion 52a has a horizontal slot 196 through which fasteners 197 extend. Fasteners 197 secure cross bar 52 to frame members 6a and may include optional plate 198, which functions as a washer. The opposite end portion (not shown) of cross bar 52 may be similar to end portion 52a. In another embodiment, a threaded U-bolt with nuts and washers is used to secure cross bar 52 to frame member 6a. For example, a U-bolt extends through slot 196 in cross bar 52 and around frame member 6a. Alternately, U-bolt extends over both end portion 52a and frame member 6a to secure cross bar 52 on frame 6.

Referring now to FIG. 9, a front perspective view shows one embodiment of attachment 20 installed on front end 4 of lawnmower 2. Frame members 6a, 6b typically support a cutting deck 8 that houses the lawnmower's blades. Lawnmower frame members 6a, 6b commonly extend forward of the cutting deck 8 of lawnmower 2 and include wheels 7a, 7b. Cross bar 52 extends across frame members 6a, 6b with elongated support member 80 and rigid bracket member 100 cantilevered above the ground. Rigid bracket member 100 extends transversely across forward cutting path 5 supports flexible member 150 in front of lawnmower 2. With attachment 20 positioned on lawnmower 2, the operator advances lawnmower 2 across the lawn with cutting deck 8 in operation. As flexible member 150 contacts the grass, water is brushed or knocked from grass blades. Since flexible member 150 is positioned in front of cutting deck 8, water is removed prior to the blades of cutting deck 8 cutting the grass. Thus, lawnmower 2 cuts grass with a significant portion of the water removed, therefore reducing grass clumping, clogging of grass discharge chutes, build-up of wet grass in cutting deck 8, and damage to the grass from being cut while wet.

Figure 10:
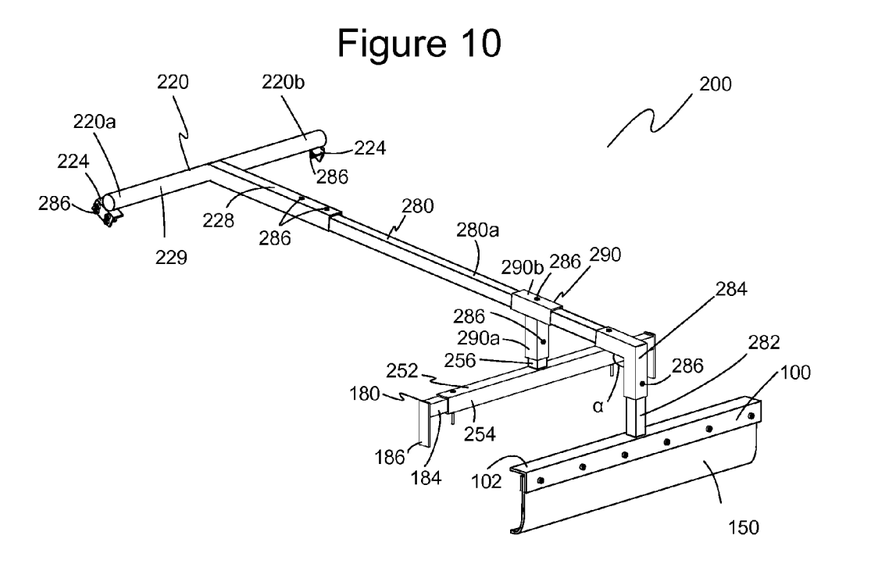
FIG. 10 is a perspective view of another embodiment of a lawnmower attachment of the present invention intended for a walk-behind lawnmower and shown from a right, front side of the attachment.

Referring now to FIG. 10, a right, front perspective view illustrates an embodiment of lawnmower attachment 200. Attachment 200 is designed for use with a walk-behind lawnmower 2' (shown in FIGS. 13-14). Attachment 200 includes a cross bar 252, rigid bracket member 100 with flexible member 150, a handle attachment 220, and a support member 280.

In this embodiment, rigid bracket member 100 with flexible member 150 is similar to rigid bracket member 100 and flexible member 150 in embodiments discussed above, except that they are sized for smaller walk-behind lawnmower 2'. Also, due to the reduced width and shape of a walk-behind lawnmower 2' compared to a riding lawnmower 2, rigid bracket member 100 has one or more substantially vertical riser post 282 that extends upward from rigid bracket member 100 and attaches to support member 280 with an elbow connector 284. In one embodiment, riser post 282 is fixedly attached by welding, fasteners, or other means to horizontal portion 102 of rigid bracket member 100.

Riser post 282 is preferably a hollow tube, such as a 1-2" square tube made of steel. Other materials and shapes of riser post 282 are acceptable and include round or square tubes or posts that are solid or hollow, angle iron, or the like and made of steel, aluminum, wood, or other materials. In one embodiment, riser post 282 is received in elbow connector 284 and held in position with a fastener 286 extending through elbow connector 284 and into or against riser post 282. By using fastener 286 or other methods to retain riser post 282 in elbow connector 284, the height of flexible member 150 above the ground can be adjusted as desired. Instead of fastener 286, a locking cuff, threaded cap, or other structure may be used to adjust and retain riser post 282 in elbow connector 284. Thus, riser post 282 is adjustably connected to or received in elbow connector 284. In other embodiments, riser post 282 is fixedly connected to or constructed as one piece with elbow connector 284 and/or support member 280. In such an embodiment, the ability to adjust the height of flexible member 150 above the ground may be accomplished, for example, by modifying the angle α between support member 280 and riser post 282 or by including height adjustments in other components of attachment 200.

Cross bar 252 is similar to embodiments of cross bar 52 discussed above. In one embodiment, cross bar 252 includes a tubular cross bar body 254 with open ends. Received in each end of cross bar 252 is extension assembly 180 that includes extension bar 184 and end piece 186 as discussed above with reference to FIG. 6. Extension assemblies 180 are adjusted to engage the frame or mower deck 208 of walk-behind lawnmower 2' (shown in FIG. 13). By adjusting the length that each extension bar 184 extends from cross bar body 254, cross bar 252 can be made to gently abut or firmly grip mower deck 208 with end pieces 186 as needed.

In one embodiment, cross bar 252 includes one or more cross bar riser 256 that is fixedly attached to cross bar body 254 and extends upwardly from cross bar body 254. Like riser post 282, cross bar riser 256 may be made of various materials and have various shapes. Cross bar riser 256 attaches to or abuts a middle portion 280a of support member 280 to provide cantilevered support of rigid bracket member 100 in front of walk-behind lawnmower 2'. In one embodiment, a T-member 290 adjustably connects cross bar riser 256 to support member 280, where T-member 290 is made of tubular steel or the like. T-member 290 receives cross bar riser 256 in a vertical portion 290a and receives support member 280 through cross portion 290b, each of which preferably includes an adjustment fastener 286 to secure the position of T-member 290 relative to cross bar riser 256 and support member 280. In other embodiments, cross portion 290b of T-member may be replaced with a U-shaped bracket or the like to support and maintain the lateral position of support member 280. Support member 280 optionally is not secured to T-member, but instead is only supported by T-member or by cross bar riser 256.

Figure 13:
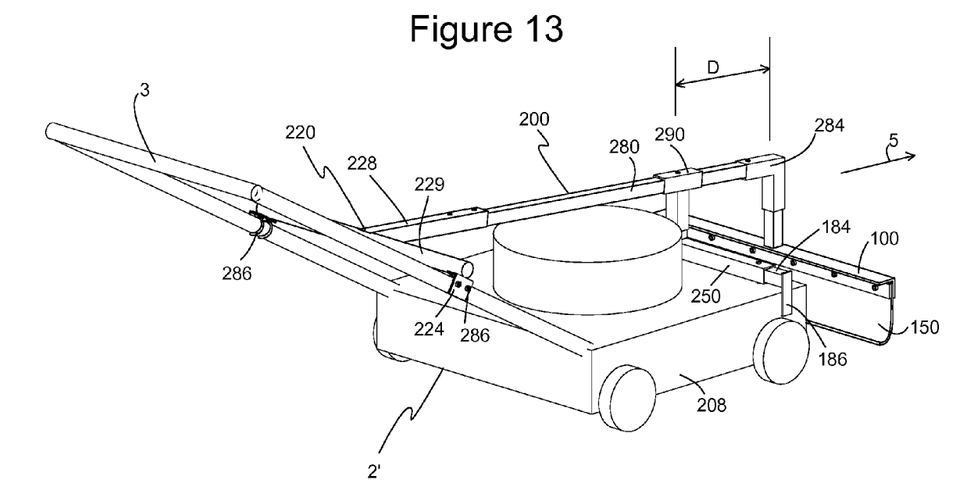
FIG. 13 is a perspective view of the lawnmower attachment of FIG. 10 shown installed on a walk-behind lawnmower and viewed from the rear and right side.

Support member 280 extends rearwardly from its connection with riser post 282 to a push handle 3 of walk-behind lawnmower 2' (shown in FIG. 13). Support member 280 is preferably made of tubular steel, but may be made of other materials and may be solid as needed to provide adequate strength for attachment 200 without undue weight. In one embodiment, support member 280 connects directly to push handle 3 using a bracket, hook, connector, or the like connected between push handle 3 and support member 280. In another embodiment, a handle attachment 220 connects to support member 280. Ends 220a, 220b connect to push handle 3 using a bracket 224 with fasteners 226 or other means. In one embodiment, brackets 224 are attached to ends 220a, 220b and/or to push bar 3 using a U-bolt that extends through bracket 224 and over lateral handle attachment 220. In other embodiments, fasteners 286 extend through brackets 224, lateral handle attachment 220, and/or push bar 3 as needed to secure attachment 200 to walk-behind lawnmower 2'.

In one embodiment, handle attachment 220 includes a longitudinal portion 228 attached to a lateral portion 229 and forming a T-shape. Longitudinal portion 228 receives, is received in, or attaches to support member 280. In one embodiment, longitudinal portion 228 adjustably receives support member 280 and includes one or more fasteners 286 to fix the length of attachment 200 from handle attachment 220 to rigid bracket member 100.

Figure 11:
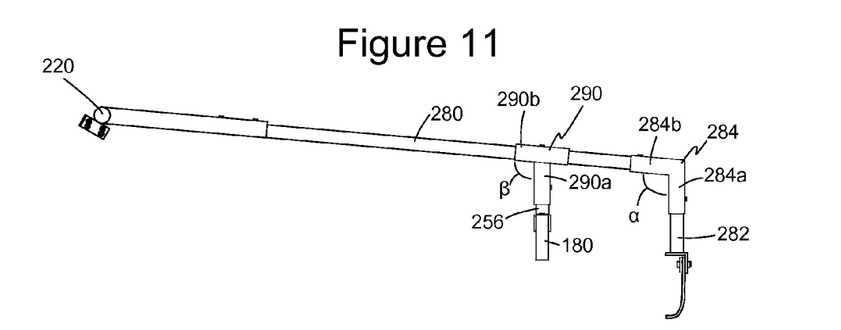
FIG. 11 is a right side view of the lawnmower attachment of FIG. 10.

Referring now to FIG. 11, a right-side view of attachment 200 is shown. Elbow connector 284 is preferably an L-shaped member that defines an interior angle $\alpha$ between a substantially vertical first portion 284a and a second portion 284b that is approximately or substantially horizontal. First portion 284a receives riser post 282 as described above; second portion 284b receives, is received by, or attaches to support member 280. Interior angle $\alpha$ is preferably between 90° and 120° to accommodate various types of walk-behind lawnmowers 2'. T-member 290 also preferably defines an angle $\beta$ between vertical portion 290a and cross portion 290b. Preferably internal angle $\alpha$ equals angle $\beta$. In one embodiment, elbow 284 is constructed so that second portion 284b pivots with respect to first portion 284a so that internal angle $\alpha$ is adjustable. Similarly, one embodiment of T-member is constructed to allow cross member 290b to pivot with respect to vertical member 290a so that angle $\beta$ is adjustable. Accordingly, with these various adjustments, attachment 200 can be adjusted to extend or position support member 280, riser post 282, cross bar riser 256, extension assemblies 180, and lateral handle attachment 220 as needed to fit a particular walk-behind lawnmower 2'.

Figure 12:
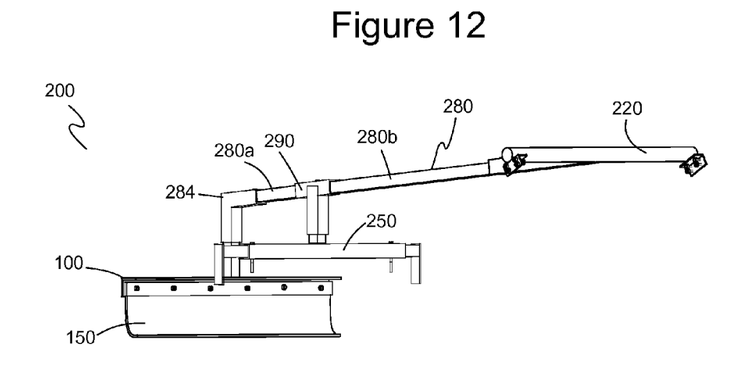
FIG. 12 is a perspective view of the lawnmower attachment of FIG. 10 as viewed from the rear and left side.

Referring now to FIG. 12, a left, rear perspective shows the embodiment of attachment 200 from FIGS. 10-11 with cross bar 252, rigid bracket member 100 with flexible member 150, lateral handle attachment 220, and a support member 280. Support member 280 is received through T-member and received by elbow 284. Support member 280 can be a single member or can comprise a plurality of members, such as front support member 280a and rear support member 280b.

Figure 14:
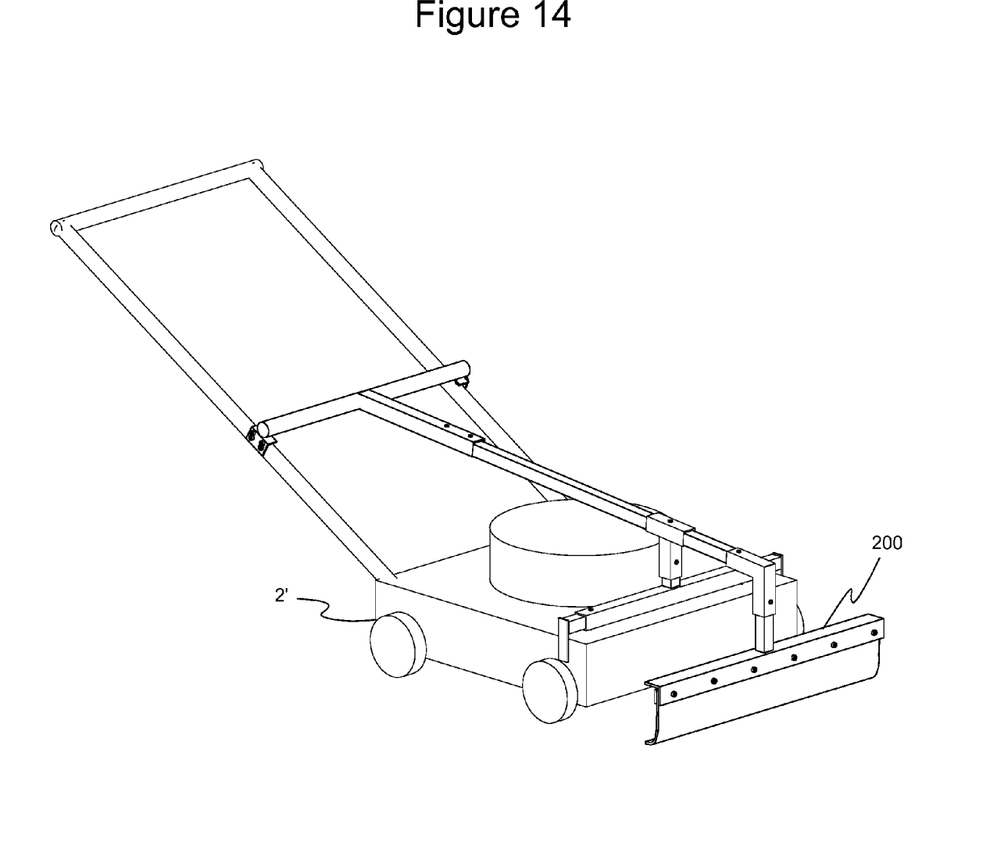
FIG. 14 is a perspective view of the lawnmower attachment and walk-behind lawnmower of FIG. 13 as viewed from the front and right side.

Referring now to FIG. 13, a right, rear perspective view shows one embodiment of attachment 200 installed on walk-behind lawnmower 2'. Lateral portion 229 of handle attachment 220 attaches to push handle 3 with brackets 224 and fasteners 286. Support member 280 extends from longitudinal portion 228 of handle attachment 220, through cross portion 290b of T-member 290, and is received in elbow 284. Cross bar 250 is attached to and supported by mower deck 208 with end piece 186 of extension assembly 180 adjusted to grip mower deck 208. Rigid bracket member 100 with flexible member 150 is cantilevered above the ground with the distance above the ground of flexible member 150 being changeable by adjusting riser post 282 in elbow connector 284. Support member 280 is adjusted so that flexible member 150 is positioned a predefined distance D in front of mower deck 208. FIG. 14 shows a right, front perspective of walk-behind lawnmower 2' with attachment 200 installed.

In use, attachment 20, 200 is installed on lawnmower 2, 2', respectively. Height of rigid bracket member 100 is preferably adjusted to extend about ten to twelve inches in front of mower deck 8, 208 with second side portion 154 of flexible member 150 extending to about one inch above the ground. As the lawnmower 2, 2' moves across a wet lawn, flexible member 150 sweeps the grass to remove water from grass blades. With flexible member adjusted as described, water is removed from grass blades and grass blades have time to substantially return to their upright position before being cut by blades of mower deck 8, 208. As a result, attachment 20, 200 enables the user to remove water from wet grass and cut the grass in one forward movement of lawnmower 2, 2'. Attachment 20, 200 therefore provides significant improvements in cutting performance, with reduced cutting time, reduced time and effort in cleaning lawnmower 2, 2', and with improved cut quality to grass blades.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. In combination a lawnmower and a lawnmower attachment, the combination comprising:
    a lawnmower with a front end portion and a cutting deck that defines a forward cutting path; and
    a lawnmower attachment attached to the front end portion of the lawnmower comprising:
        a cross bar having a first end and a second end, the cross bar attached to the lawnmower and extending horizontally across the front end of the lawnmower;

an elongated support member having a front support member portion and a rear support member portion connected transversely to the cross bar, the front support member portion extending forward of the cutting deck and away from the cross bar a predefined distance;

a longitudinal, rigid bracket member attached to and supported by the front support member portion forward of the cutting deck and extending transversely across the forward cutting path of the lawnmower; and a flexible rubber sheet having a first side secured along the longitudinal, rigid bracket member and extending a distance down and away from the rigid bracket member to an unattached second side to contact wet grass when the lawnmower moves across the wet grass, wherein the flexible rubber sheet has a height of at least six inches from the first side to the unattached second side; and at least one rear support bracket extending rearwardly from the cross bar to engage the lawnmower;

wherein the longitudinal, rigid bracket member biases the at least one rear support bracket to pivot upwardly about the cross bar to engage the lawnmower when the attachment is installed on the lawnmower; and wherein when the lawnmower attachment is installed on the lawnmower, the unattached second side of the flexible rubber sheet extends to contact only portions of the wet grass taller than one inch.

2. The combination of claim 1, wherein the at least one support bracket also extends downwardly from the cross bar and includes an upwardly-facing engagement surface.

3. The combination of claim 1, wherein the elongated support member is pivotably attached to the cross bar with a pivot point positioned forward of the cross bar.

4. The combination of claim 3, further comprising:
a lever connected to and extending upward from the rear support member portion, wherein operating the lever causes the elongated support member to pivot about the pivot point, thereby adjusting a vertical position of the longitudinal flexible member.

* * * * *